United States Patent
Foss

(10) Patent No.: US 8,607,508 B2
(45) Date of Patent: Dec. 17, 2013

(54) STAYED CONNECTION FOR WIND TURBINE

(75) Inventor: Gunnar Foss, The Hague (NL)

(73) Assignee: Owec Tower AS, Bergen (NO)

( * ) Notice: Subject to any disclaimer, the term of this patent is extended or adjusted under 35 U.S.C. 154(b) by 0 days.

(21) Appl. No.: 12/737,249

(22) PCT Filed: Jun. 22, 2009

(86) PCT No.: PCT/NO2009/000231
§ 371 (c)(1),
(2), (4) Date: Feb. 22, 2011

(87) PCT Pub. No.: WO2009/157775
PCT Pub. Date: Dec. 30, 2009

(65) Prior Publication Data
US 2011/0146192 A1   Jun. 23, 2011

(30) Foreign Application Priority Data
Jun. 24, 2008 (NO) .................................... 20082817

(51) Int. Cl.
*E04H 12/00* (2006.01)
(52) U.S. Cl.
USPC ............ 52/40; 52/152; 52/651.07; 52/651.09
(58) Field of Classification Search
USPC ................. 52/40, 146, 152, 651.01, 651.02, 52/651.07, 651.09, 831; 403/218
See application file for complete search history.

(56) References Cited

U.S. PATENT DOCUMENTS

| | | | | |
|---|---|---|---|---|
| 508,078 A * | 11/1893 | Baker | ............... | 52/40 |
| 567,339 A * | 9/1896 | Flagg | ............... | 416/14 |
| 749,944 A * | 1/1904 | McFeron | ............... | 52/146 |
| 1,895,165 A * | 1/1933 | Langer | ............... | 256/35 |
| 2,849,202 A * | 8/1958 | McCombs | ............... | 248/515 |
| 2,901,890 A | 9/1959 | Hutchison | | |
| 3,239,251 A * | 3/1966 | Hills | ............... | 285/189 |
| 4,425,048 A * | 1/1984 | Kamohara et al. | ............... | 403/191 |
| 4,607,983 A * | 8/1986 | Meek et al. | ............... | 405/204 |
| 5,832,688 A | 11/1998 | Crissey et al. | | |

FOREIGN PATENT DOCUMENTS

| | | |
|---|---|---|
| NO | 320948 B1 | 2/2006 |
| NO | 322247 B1 | 9/2006 |
| WO | WO 2006004417 A1 * 1/2006 | ............. E04H 12/10 |

* cited by examiner

*Primary Examiner* — Brian Glessner
*Assistant Examiner* — Adam Barlow
(74) *Attorney, Agent, or Firm* — Patents + TMS, P.C.

(57) ABSTRACT

A stayed connection for a wind turbine (1) is provided with a tower (4) having an upper pipe-shaped tower portion (12) and a lower tower portion (14) and where the upper pipe-shaped tower portion (12) is connected to the lower tower portion (14) by means of a stayed connection (16), and wherein the stayed connection (16) comprises pipe-shaped diagonal stays (18) extending from the lower tower portion (14) and in toward the outside of the upper pipe-shaped tower portion (12), as the diagonal stays (18) at their toward the upper pipe-shaped tower portion (12) facing end portion (28) are compressed and connected directly or via a plate portion (30) to the upper pipe-shaped tower portion (12) by means of a welded connection.

9 Claims, 4 Drawing Sheets

IIa-IIa

IIb-IIb

VII-VII

STAYED CONNECTION FOR WIND TURBINE

CROSS REFERENCE TO RELATED APPLICATIONS

This application claims benefit of PCT Application Serial Number PCT/NO2005/000373 filed on Oct. 10, 2005, Norwegian Application Serial Number 20054257 filed on Sep. 15, 2005 and Norwegian Application Serial Number 20044356 filed on Oct. 13, 2004.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A CD

Not Applicable

BACKGROUND OF THE INVENTION (a) Field of the Invention

This invention relates to a stayed connection for a wind turbine. More particularly it relates to a stayed connection for a wind turbine where the wind turbine tower comprises an upper, pipe-shaped tower portion and a lower tower portion, and where the upper pipe-shaped tower portion is connected to the lower tower portion by means of a stayed connection.

(b) Description of Related Art

The upper portion of a wind turbine is formed like a slender structure to avoid collision with the wind turbine sails. From land based wind turbines is known that this slender structure which is generally made of a pipe, is connected to a foundation in the ground.

When wind turbines are positioned offshore and more often in relatively deep water, using a pipe extending from the wind turbine foundation on the sea bed and up to the wind turbine machinery housing, is not practical.

The load bearing structure in known wind turbines positioned offshore therefore often comprise a pipe shaped upper portion and a lower portion, where the lower portion may be constituted by such as a trussed structure.

The transition between the upper slender portion of the tower and the lower portion is often constituted by a relatively heavy and complicated structure. The reason for this is among other things the use of design principles known from off-shore-based oil production equipment. Such equipment is dimensioned for considerable wave forces and to be able to handle heavy equipment, and also for personnel to reside on the structure at all times.

In wind turbine installations it is common, also offshore, that the wind forces decide the structural design.

Transitions of this prior art are relatively flexible. They have to be adapted so that the tower natural period is short enough for the relevant wind turbine. This contributes to a further increase in tower weight.

It is a known problem that in stayed structures so-called secondary forces exists due to the shape and relative dimensions of the structure. Considerable bending stresses may for example be set up in a first stay due to deflection in a second stay when the first stay is welded to the second stay.

Such secondary forces cause the stay dimension to be increased and contributes thus to increased weight and cost.

BRIEF SUMMARY OF THE INVENTION

The object of the invention is to remedy or reduce at least one of the prior art drawbacks.

The object is achieved by features stated in the below description and in the following claims.

A stayed connection is provided for a wind turbine where the wind turbine tower comprises an upper, pipe-shaped tower portion and a lower tower portion, and where the upper pipe-shaped tower portion is connected to the lower tower portion by means of a stayed connection, and where the stayed connection is characterised in that it comprises pipe-shaped diagonal stays extending from the lower tower portion and in toward the outside of the upper pipe-shaped tower portion, as end portions of the diagonal stays facing the upper pipe-shaped tower portion are compressed and connected directly or via a plate portion to the upper pipe-shaped tower portion by means of a welded connection.

The plate portion of the stayed connection may at least partly surround the upper pipe-shaped tower portion. The plate portion contributes thus to distribute the forces from the diagonal stay toward the upper pipe-shaped tower portion, and to stiffen the upper pipe-shaped tower portion at the plate portion.

The diagonal stay in the stayed connection may have the longest cross-sectional axis of the compressed stay portion parallel with the longitudinal axis of the upper pipe-shaped portion. By appropriate selection of the diagonal stay connection point to the upper pipe-shaped tower portion relative to an about the pipe-shaped tower portion surrounding ring plate, it may be assured that the resultant of the horizontal and vertical forces acting at the connection point are transferred as axial forces in the diagonal stay.

The diagonal stay in the stayed connection may have the longest cross-sectional axis of the compressed stay portion lateral to the longitudinal axis of the upper pipe-shaped portion. In this embodiment only small bending moments are transmitted to the diagonal stay from a deflection of the upper pipe-shaped tower portion due to the compressed profile of the diagonal stay.

The plate portion of the stayed connection between the compressed stay portion and the upper pipe-shaped portion has the same direction as the longitudinal axis of the diagonal stay. The axial forces of the diagonal stay are thereby transmitted to the upper pipe-shaped tower portion without bending forces of any significance being generated in the plate portion. The plate portion, which may be given a conical shape, may surround the upper pipe-shaped tower portion.

The plate portion of the stayed connection may run into the compressed end portion. A solution like that may simplify the production process in that distances between parts may be adjusted relatively easy before welding.

Bending moment from the upper pipe-shaped tower portion is transmitted from the upper pipe-shaped tower portion as a force couple. A torsion plate positioned at the end portion of the upper pipe-shaped tower portion, and which is connected to the lower tower portion takes up the lower force from the force couple. The upper force from the force couple makes up a horizontal force at the ring plate or plate portion.

The vertical forces and the upper horizontal force from the force couple are combined to a resultant axial force in the diagonal stay, as the torsion plate takes up vertical forces only to an insignificant degree.

The torque from the upper pipe-shaped tower portion is transmitted to the lower tower portion via the torsion plate.

The produced stayed connection makes possible a significant weight reduction compared to prior art. At the same time the fabrication process is simplified significantly relative to prior art stayed connections.

BRIEF DESCRIPTION OF THE SEVERAL VIEWS OF THE DRAWINGS

In the following is described an example of a preferred embodiment illustrated in the accompanying drawings, wherein.

DETAILED DESCRIPTION OF THE INVENTION

Figure 1:
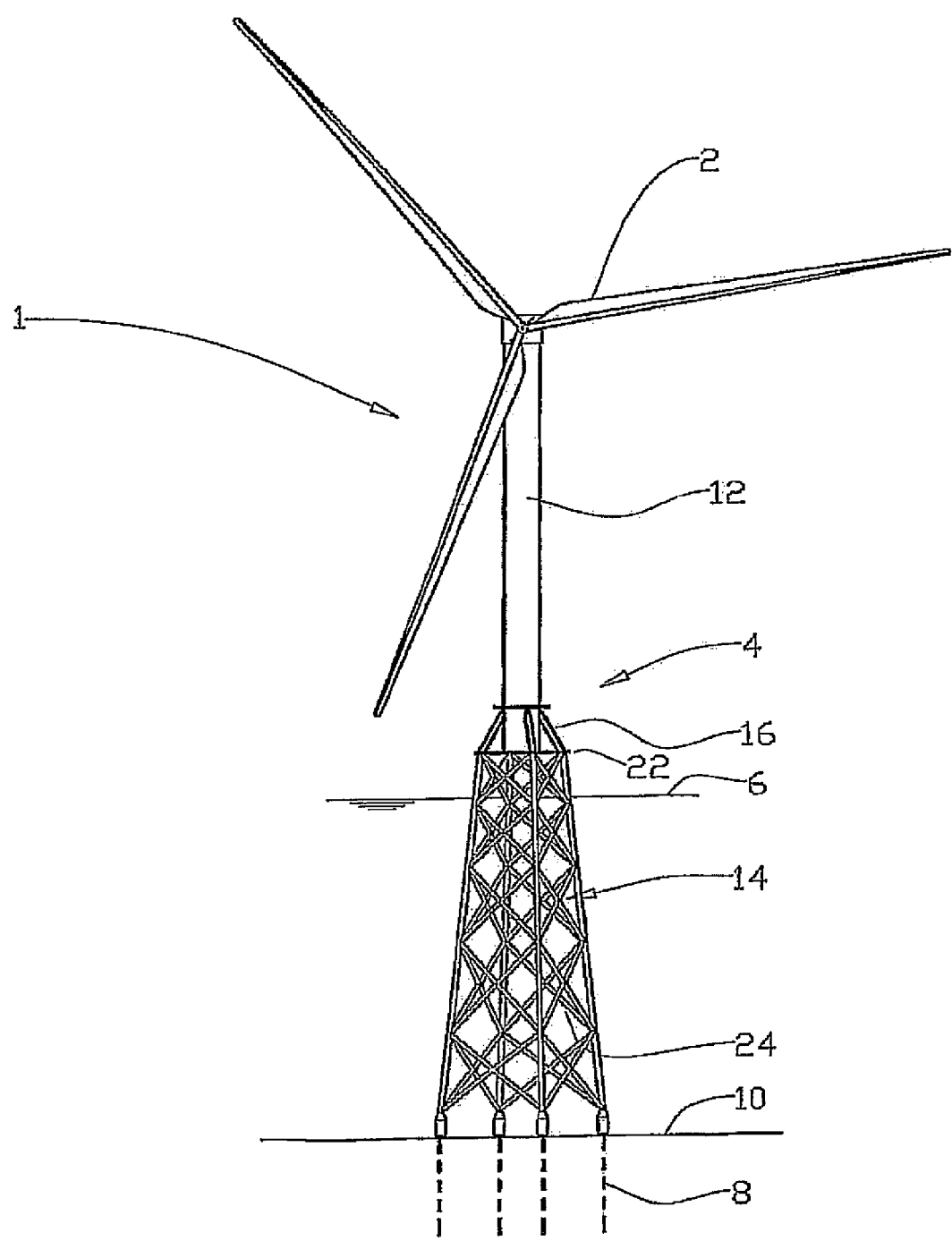
FIG. 1 shows a wind turbine positioned in an area of relatively deep water, and where the wind turbine tower comprises an upper pipe-shaped tower portion connected to a lower tower portion by means of a stayed connection.

In the drawings, the reference numeral 1 indicates a wind turbine comprising a turbine 2 and a tower 4. The wind turbine 1 tower 4 is partly submerged below the sea surface 6. The tower 4 is connected to piles 8 which are driven down into the seabed 10.

The tower 4 comprises an upper pipe-shaped tower portion 12 and a lower tower portion 14.

Figure 2:
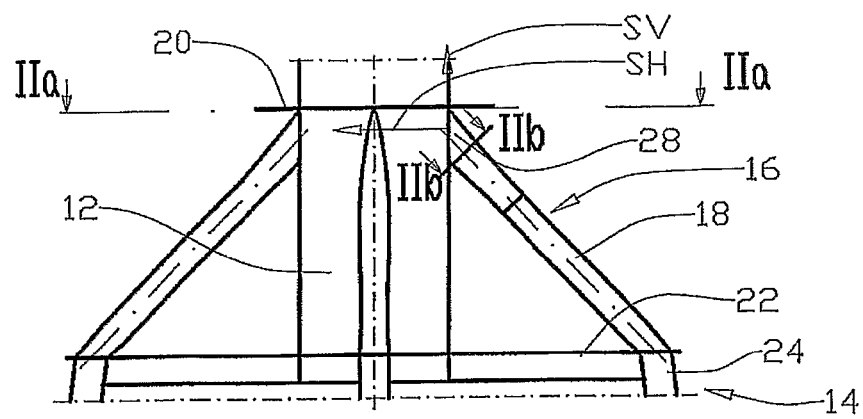
FIG. 2 shows in greater detail a side view of the stayed connection.
Figure 3:
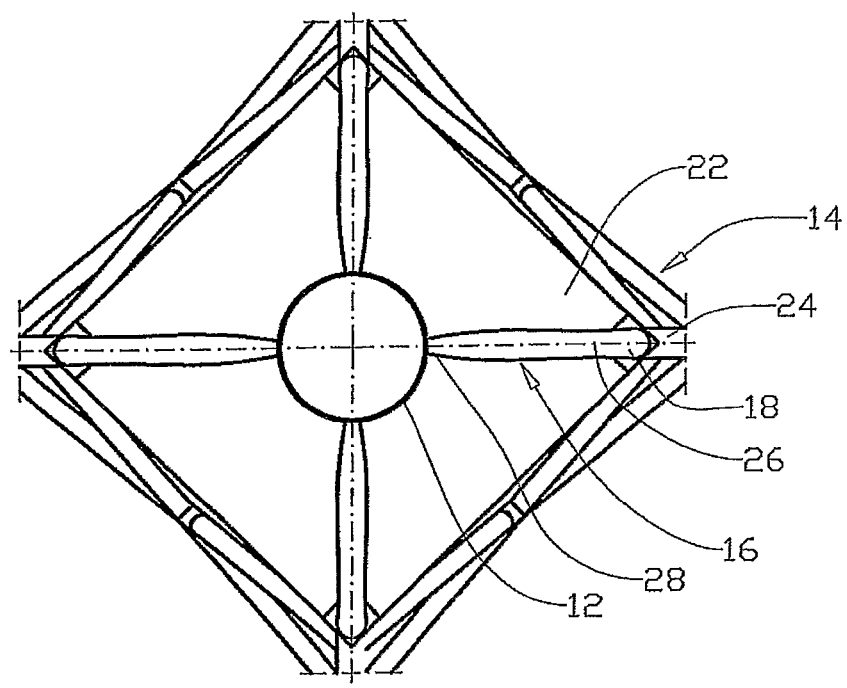
FIG. 3 shows a section IIa-IIa of FIG. 2.

The upper pipe-shaped tower portion 12 is connected to the lower tower portion 14 by means of a stayed connection 16 comprising four pipe-shaped diagonal stays 18, a ring plate 20 and a torsion plate 22, see FIG. 2. Both the ring plate 20 and the torsion plate 22 surrounds and extend radially from the upper pipe-shaped tower portion 12. The ring plate 20 is positioned at a level somewhat higher up than the torsion plate 22, as the torsion plate 22 is connected to the lower tower portion 14 main pillars 24.

The diagonal stays 18 run from one main pillar 24 each and up to the upper pipe-shaped tower portion 12 and the ring plate 20, as the central axis 26 of the diagonal stays 18 intersects the upper pipe-shaped tower portion 12 near the connection line of the ring plate 20 with the upper pipe-shaped tower portion 12.

The upper pipe-shaped tower portion 12, the diagonal stays 18, the ring plate 20 and the torsion plate 22 are all made from relatively thin material so that the forces between them are mainly membrane stresses.

As mentioned in the general part of the document, torsion forces in the upper pipe-shaped tower portion 12 are transmitted to the lower tower portion 14 via the torsion plate 22. Vertical forces in the upper pipe-shaped tower portion 12 are transmitted to the diagonal stays 16 via first shear forces in the connection between the upper pipe-shaped tower portion 12 and the diagonal stay 18.

Horizontal forces acting on the upper pipe-shaped tower portion 12 set up a bending moment in the upper pipe-shaped tower portion 12. A force couple between the ring plate 20 and the torsion plate 22 takes up this bending moment. From the ring plate 20 this horizontal force is transmitted to the diagonal stays 18 by means of second shear forces between the ring plate 20 and the diagonal stays 18.

The resultant of the first shear stresses are represented in FIG. 2 by the force SV, while the resultant of the second shear forces are represented by the force SH. The force SV is normally not quite vertical, as that part of the diagonal stay 18, which is connected to the upper pipe-shaped tower portion 12, follows the cylindrical surface of the upper pipe-shaped tower portion 12. The resultant force of the forces SV and SH acts on the diagonal stay 18. The centreline of the diagonal stay 18 intersects the crossing point between the forces SV and SH. The diagonal stays 18 are thus given bending moments to only an insignificant degree in the connection to the upper pipe-shaped tower portion 12.

Figure 4:
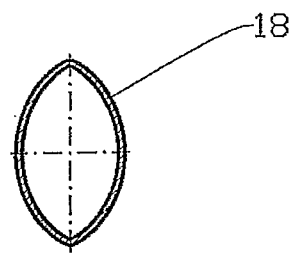
FIG. 4 shows in further greater detail a section IIb-IIb of FIG. 2.
Figure 5:
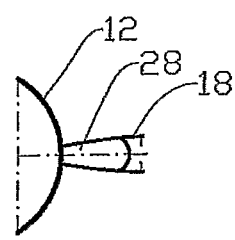
FIG. 5 shows in greater detail a section of FIG. 3.

The diagonal stay 18, which is originally of cylindrical shape, is given an unround shape in the section IIb-IIb, see FIG. 4. There is such an even transition between the cylindrical shape and a compressed end portion 28 at the upper pipe-shaped tower portion 12. The compressed end portion 28 is not necessarily squeezed completely flat, see FIG. 5, but may have a relatively oblong oval shape.

Figure 6:
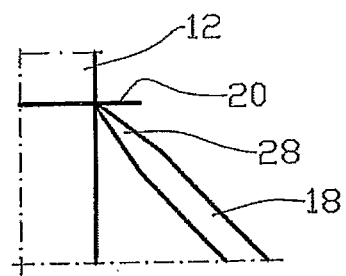
FIG. 6 shows an alternative embodiment of the stayed connection.

In an alternative embodiment, see FIG. 6, the compressed end portion 28 is formed to fit against the upper pipe-shaped tower portion 12. The compressed portion 28 is welded to the upper pipe-shaped portion.

Figure 7:
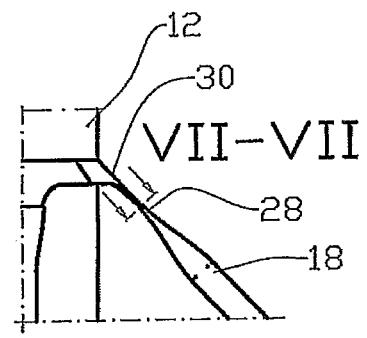
FIG. 7 shows an alternative embodiment of the stayed connection.

In a further embodiment, see FIG. 7, the diagonal stay 18 is connected to the upper pipe-shaped portion by means of a plate portion 30. The plate portion 30 is given a conical shape and surrounds the upper pipe-shaped tower portion 12. The plate portion 30 takes thus over the function of the ring plate 20 as described above.

Figure 8:
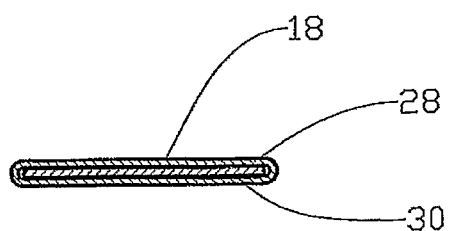
FIG. 8 shows in greater detail a section VII-VII of FIG. 7.

The plate portion 30 may run somewhat into the compressed end portion 28 as shown by the section in FIG. 8.

The invention claimed is:

1. A wind turbine supportive structure comprising:
   a tower having an upper tower portion, the upper tower portion having a top region and is pipe-shaped, and a lower tower portion having a top region configured as a torsion plate wherein the upper tower portion has a cross-section less than a smallest cross-section at the top region of the lower tower portion and wherein the top portion of the upper tower portion is capable of supporting a wind turbine section with a propeller and an associated turbine;
   a structural device associated with the upper tower portion, the structural device having an underside wherein the structural device is a plate portion shaped like a collar which surrounds at least partly a circumference of the upper tower portion; and
   a plurality of stays extending inclined upwardly from an outer region of the top region of the lower tower portion and inwardly towards the upper tower portion, each stay having a lower end and an upper end wherein each stay is attached with the lower end thereof to the outer region of the top region of the lower tower portion and with the upper end attached to at least one of the upper tower portion and the structural device associated with the upper tower portion wherein each stay is pipe-shaped wherein the upper end of the stay is compressed to present a cross-section thereof having a long axis and a short axis, the long axis being in a plane co-planar with a longitudinal axis of the upper tower portion and further wherein the upper end of each stay has a circumferential end edge face wherein the circumferential end edge face of the upper end of each stay is attached by welding to the upper tower portion, the circumferential end edge face of the upper end of each stay being inclined relative to a longitudinal axis of the stay and being parallel to the longitudinal axis of the upper tower portion and an uppermost end of the circumferential end edge face of the upper end of each stay faces the underside of the structural device, and the longitudinal axis of the stay intersecting the upper tower portion at a location being a distance below the underside of the structural device.

2. The wind turbine supportive structure of claim 1 wherein the stays have a uniform cross-section at any location of the stay below the compressed upper end thereof.

3. The wind turbine supportive structure of claim 1 wherein the structure has four stays and further wherein the torsion plate of the top region of the lower tower portion is configured to be a square and further wherein the lower end of each stay is attached to the torsion plate at a respective corner region thereof and further wherein the lower tower portion has four main pillars which are downwardly and outwardly inclined, the top of each pillar being attached to the torsion plate at a respective corner region thereof, thereby interconnecting each stay with a respective main pillar and further wherein the main pillars of the lower tower portion are structurally interconnected by the torsion plate and a trusswork.

4. A wind turbine supportive structure comprising:
a tower having an upper tower portion, the upper tower portion having a top region and is pipe-shaped, and a lower tower portion having a top region configured as a torsion plate wherein the upper tower portion has a cross-section less than a smallest cross-section at the top region of the lower tower portion and wherein the top portion of the upper tower portion is capable of supporting a wind turbine section with a propeller and an associated turbine;
a structural device associated with the upper tower portion, the structural device having an underside wherein the structural device is a plate portion shaped like a collar which surrounds at least partly a circumference of the upper tower portion; and
a plurality of stays extending inclined upwardly from an outer region of the top region of the lower tower portion and inwardly towards the upper tower portion, each stay having a lower end and an upper end wherein each stay is attached with the lower end thereof to the outer region of the top region of the lower tower portion and with the upper end attached to at least one of the upper tower portion and the structural device associated with the upper tower portion and wherein each stay is pipe-shaped wherein the upper end of each stay is compressed to present a cross-section thereof having a long axis and a short axis, the short axis being in a plane co-planar with a longitudinal axis of the upper tower portion, and each stay has a uniform cross-section at any location of the stay below the compressed upper end thereof and further wherein the upper end of each stay has a circumferential end edge face wherein the circumferential end edge face of the upper and of each stay is attached by welding to an intersection region between the upper tower portion and the underside of the structural device.

5. The wind turbine supportive structure of claim 4 wherein the structure has four stays and further wherein the torsion plate of the top region of the lower tower portion is configured to be a square and further wherein the lower end of each stay is attached to the torsion plate at a respective corner region thereof and further wherein the lower tower portion has four main pillars which are downwardly and outwardly inclined, the top of each pillar being attached to the torsion plate at a respective corner region thereof, thereby interconnecting each stay with a respective main pillar and further wherein the main pillars of the lower tower portion are structurally interconnected by the torsion plate and a trusswork.

6. A wind turbine supportive structure comprising:
a tower having an upper tower portion, the upper tower portion having a top region and is pipe-shaped, and a lower tower portion having a top region configured as a torsion plate wherein the upper tower portion has a cross-section less than a smallest cross-section at the top region of the lower tower portion and wherein the top portion of the upper tower portion is capable of supporting a wind turbine section with a propeller and an associated turbine;
a structural device associated with the upper tower portion, the structural device having an underside wherein the structural device is a plate portion shaped like a collar which surrounds at least partly a circumference of the upper tower portion and is downwardly and outwardly flared to present a truncated conical shape; and
a plurality of stays extending inclined upwardly from an outer region of the top region of the lower tower portion and inwardly towards the upper tower portion, each stay having a lower end and an upper end wherein each stay is attached with the lower end thereof to the outer region of the top region of the lower tower portion and with the upper end attached to at least one of: the upper tower portion and the structural device associated with the upper tower portion wherein each stay is pipe-shaped wherein the upper end of the stay is compressed to present a cross-section thereof having a long axis and a short axis, the short axis being in a plane co-planar with a longitudinal axis of the upper tower portion and further wherein the upper end of each stay is attached by welding to the a lower end part of the plate portion, the lower end part of the plate portion being configured to at least partly extend into an interior space of the upper end of each stay.

7. The wind turbine supportive structure of claim 6 wherein the stays have a uniform cross-section at any location of the stay below the compressed upper end thereof.

8. The wind turbine supportive structure of claim 6 wherein the plate portion is outwardly flared relative to the longitudinal axis of the upper tower portion by an angle equal to an inclination angle of the stay relative to the longitudinal axis of the upper tower portion and wherein the plate portion at the engagement location with the stay extends in a direction being that of the longitudinal axis of the stay.

9. The wind turbine supportive structure of claim 6 wherein the structure has four stays and further wherein the torsion plate of the top region of the lower tower portion is configured to be a square and further wherein the lower end of each stay is attached to the torsion plate at a respective corner region thereof and further wherein the lower tower portion has four main pillars which are downwardly and outwardly inclined, the top of each pillar being attached to the torsion plate at a respective corner region thereof, thereby interconnecting each stay with a respective main pillar and further wherein the main pillars of the lower tower portion are structurally interconnected by the torsion plate and a trusswork.

* * * * *